(12) United States Patent
Jordan

(10) Patent No.: US 9,493,212 B2
(45) Date of Patent: Nov. 15, 2016

(54) BICYCLE DERAILLEUR AND METHOD

(71) Applicant: SRAM, LLC, Chicago, IL (US)

(72) Inventor: Brian Jordan, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 32 days.

(21) Appl. No.: 14/186,121

(22) Filed: Feb. 21, 2014

(65) Prior Publication Data

US 2014/0171242 A1 Jun. 19, 2014

Related U.S. Application Data

(62) Division of application No. 12/968,533, filed on Dec. 15, 2010, now Pat. No. 8,678,962.

(51) Int. Cl.
*B62M 9/1342* (2010.01)
*B62M 9/131* (2010.01)
*B62M 9/134* (2010.01)
*B62M 9/1344* (2010.01)

(52) U.S. Cl.
CPC ........... *B62M 9/1342* (2013.01); *B62M 9/131* (2013.01); *B62M 9/134* (2013.01); *B62M 9/1344* (2013.01); *Y10T 29/49826* (2015.01)

(58) Field of Classification Search
CPC   B62M 9/1342; B62M 9/1344; B62M 9/131; B62M 9/134
USPC .............................................. 474/78, 80, 82
See application file for complete search history.

(56) References Cited

U.S. PATENT DOCUMENTS

| 4,194,409 A | * | 3/1980 | Nagano | ................... | B62M 9/136 |
| | | | | | 474/80 |
| 4,199,997 A | | 4/1980 | Isobe | | |
| 4,279,172 A | * | 7/1981 | Nagano | ............... | B62M 9/1342 |
| | | | | | 280/236 |
| 4,330,137 A | | 5/1982 | Nagano | | |
| 4,362,522 A | | 12/1982 | Huret | | |
| 4,424,048 A | | 1/1984 | Shimano | | |
| 4,500,302 A | | 2/1985 | Crepin | | |
| 4,543,078 A | | 9/1985 | Coue | | |
| 4,613,319 A | | 9/1986 | Nagano | | |
| 4,674,995 A | | 6/1987 | Iwasaki | | |
| 4,781,657 A | | 11/1988 | Nagano | | |
| 4,955,849 A | | 9/1990 | Nagano | | |
| 5,197,927 A | * | 3/1993 | Patterson | ............... | B62K 23/04 |
| | | | | | 474/80 |
| 7,014,584 B2 | | 3/2006 | Nanko | | |
| 7,186,194 B2 | | 3/2007 | Nankou | | |
| 7,285,064 B2 | | 10/2007 | Ichida | | |

(Continued)

FOREIGN PATENT DOCUMENTS

FR    2640931     6/1990
JP    57-57194    4/1991

OTHER PUBLICATIONS

Shimano Bicycle System Components, Copyright Apr. 1982, by Shimano Industrial Co., Ltd.

*Primary Examiner* — Michael Riegelman
(74) *Attorney, Agent, or Firm* — Milan Milosevic; Lisa Serdynski

(57) ABSTRACT

A front derailleur for use on devices such as bicycles is movable about a yaw axis while it moves laterally. The front derailleur may include a linkage in between a mount and a cage, with the linkage pivoting about two non-parallel axes. The front derailleur may include a linkage in between the mount and the cage that has links of different effective lengths. The front derailleur may include a single link and a cam.

4 Claims, 11 Drawing Sheets

(56) References Cited

U.S. PATENT DOCUMENTS

| | | |
|---|---|---|
| 7,438,658 B2 | 10/2008 | Tetsuka |
| 7,677,998 B2 | 3/2010 | Tetsuka |
| 7,914,407 B2 | 3/2011 | Fukushima |
| 2013/0029795 A1 | 1/2013 | Jordan |

\* cited by examiner

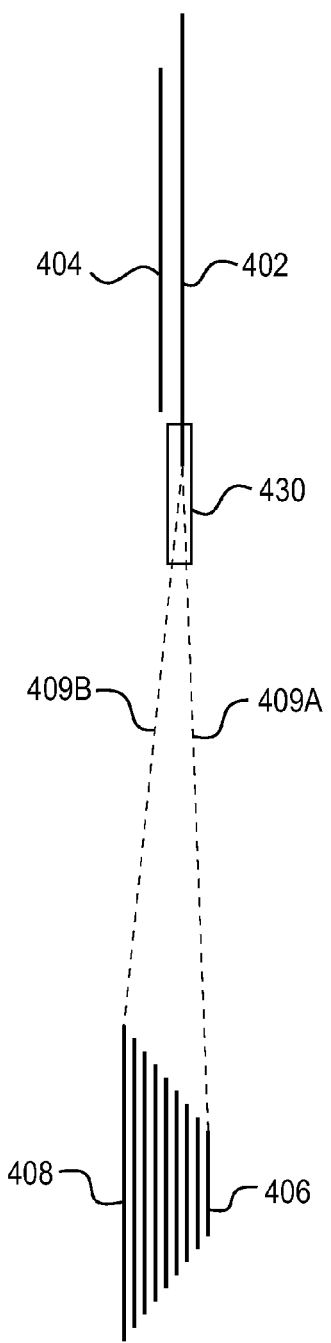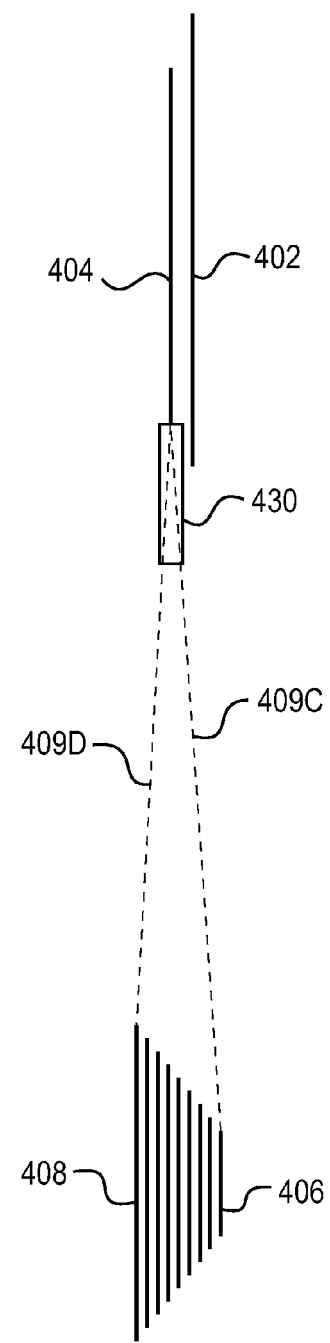
FIG. 16  FIG. 17

BICYCLE DERAILLEUR AND METHOD

BACKGROUND

1. Field of the Invention

The present invention relates to bicycles and more particularly to a bicycle having a derailleur.

2. Description of Related Art

Typically, a derailleur-type bicycle has a drive train that includes a set of front chainwheels or chainrings, a set of rear chainwheels or cogs and a chain engaged with and extending between one of the front chainrings and one of the rear cogs. The front chainrings are mounted to a crank axle and the rear cogs are mounted to a rear wheel hub axle. The chain is shifted between the front chainrings by a front derailleur and between the rear cogs by a rear derailleur. The rear derailleur includes a cage for laterally displacing the chain between the rear cogs. The cage includes side plates, a chain guide toothed pulley and a tension toothed pulley, the pulleys disposed between the side plates and engaging between a pair of links of the chain to laterally displace the chain. The front derailleur includes a cage having side plates spaced apart to interiorly receive a portion of the chain and contact an exterior side of the chain to displace it laterally between adjacent chainrings.

One drawback with a derailleur-type bicycle is that when the chain is engaged with an outermost or an innermost rear cog, the chain contacts the cage of the front derailleur causing a rasping noise. Therefore, there is a need to provide a front derailleur that inhibits or prevents the chain from contacting the front derailleur to reduce or eliminate the rasping noise.

SUMMARY

A brief summary of various exemplary embodiments is presented in this section. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

In some aspects described herein, a front derailleur for a bicycle is rotatable about a yaw axis while it moves laterally. The front derailleur may include a linkage in between a mount and a cage, with the linkage pivoting about two non-parallel axes. The front derailleur may include a linkage in between the mount and the cage that has links of different effective lengths. The linkage may include a link and a cam.

In aspects of some embodiments there is provided a front derailleur for a bicycle having a frame member and a chain engaging one of a plurality of chainwheels. The frame member has a longitudinal axis. The front derailleur includes a mount configured to be fixed to the frame, a movable element separate from the mount and a linkage connecting the movable element to the mount. The movable element interiorly receives a portion of the chain and contacts an exterior side of the chain to laterally displace the chain between the plurality of chainwheels. The linkage is configured so that the movable element is movable laterally with respect to the frame member and rotatably about a yaw axis substantially parallel to the longitudinal axis.

In aspects of other embodiments there is provided a front derailleur for a bicycle having a frame member and a chain engaging one of a plurality of chainwheels. The front derailleur includes a mount configured to be fixed to the frame, a movable element separate from the mount and a linkage connecting the movable element to the mount. The movable element interiorly receives a portion of the chain and contacts an exterior side of the chain to laterally displace the chain between the plurality of chainwheels. The linkage includes a first link member connecting the movable element to the mount. The first link member is pivotally connected to the mount about a first pivot axis and the first link member is pivotally connected to the movable element about a second pivot axis, wherein the second pivot axis is at a non-zero angle relative to the first pivot axis.

In aspects of still other embodiments there is provided a front derailleur for a bicycle having a frame member and a chain engaging one of a plurality of chainwheels. The front derailleur includes a mount configured to be fixed to the frame, a movable element separate from the mount and first and second links connecting the movable element to the mount. The movable element interiorly receives a portion of the chain and contacts an exterior side of the chain to laterally displace the chain between the plurality of chainwheels. The first link member is pivotally connected to the mount about a first pivot axis and the first link member is pivotally connected to the movable element about a second pivot axis. The first link member has a length between the first and second pivot axes. The second link member is pivotally connected to the mount about a third pivot axis and the second link member is pivotally connected to the movable element about a fourth pivot axis. The second link member has a length between the third and fourth pivot axes. The first and second link lengths are unequal to each other or a length between the first and third axes and a length between the second and fourth axes are unequal to each other.

In aspects of yet other embodiments there is provided a front derailleur for a bicycle having a frame and a chain engaging one of a plurality of front chainwheels having a front chainwheel axis and engaging one of a plurality of rear chainwheels having a rear chainwheel axis. The front derailleur includes a mount configured to be fixed to the frame, a movable element separate from the mount and a linkage connecting the movable element to the mount. The movable element has front and rear ends, the front end being farther from the rear chainwheels than the rear end. The movable element interiorly receives a portion of the chain and contacts an exterior side of the chain to laterally displace the chain between the plurality of front chainwheels. The linkage is configured to move the movable element from a first position to a second position relative to a plane perpendicular to the front chainwheel axis. The front end of the movable element moves a first distance from the first position to the second position relative to the plane. The rear end of the movable element moves a second distance from the first position to the second position relative to the plane, the first and second distances being unequal to each other.

In aspects of yet other embodiments there is provided a front derailleur for a bicycle having a frame member and a chain engaging one of a plurality of chainwheels. The frame member has a longitudinal axis. The front derailleur includes means for mounting the front derailleur to the frame member; means for interiorly receiving a portion of the chain and contacting an exterior side of the chain to laterally displace the chain between the plurality of chainwheels; the receiving and contacting means are separate from the mounting means; and means for linking the mounting means and the receiving and contacting means and moving the receiving and contacting means laterally with respect to the frame member and rotatably about a yaw axis substantially parallel to the longitudinal axis.

In aspects of further other embodiments there is provided a method of operating a front derailleur to displace a chain between a plurality of chainwheels for a bicycle having a frame member having a longitudinal axis, including: mounting the front derailleur to the frame member; routing a portion of the chain interiorly within the movable element; and moving the movable element laterally with respect to the frame member and rotatably about a yaw axis substantially parallel to the longitudinal axis to contact an exterior side of the chain to laterally displace the chain between the plurality of chainwheels.

BRIEF DESCRIPTION OF THE DRAWINGS

In order to better understand various exemplary embodiments, reference is made to the accompanying drawings, wherein:

FIG. 16 is top diagrammatic view of a derailleur according to some various embodiments in a first position; and FIG. 17 is a top diagrammatic view of a derailleur according to some various embodiments in a second position.

DETAILED DESCRIPTION

Figure 1:
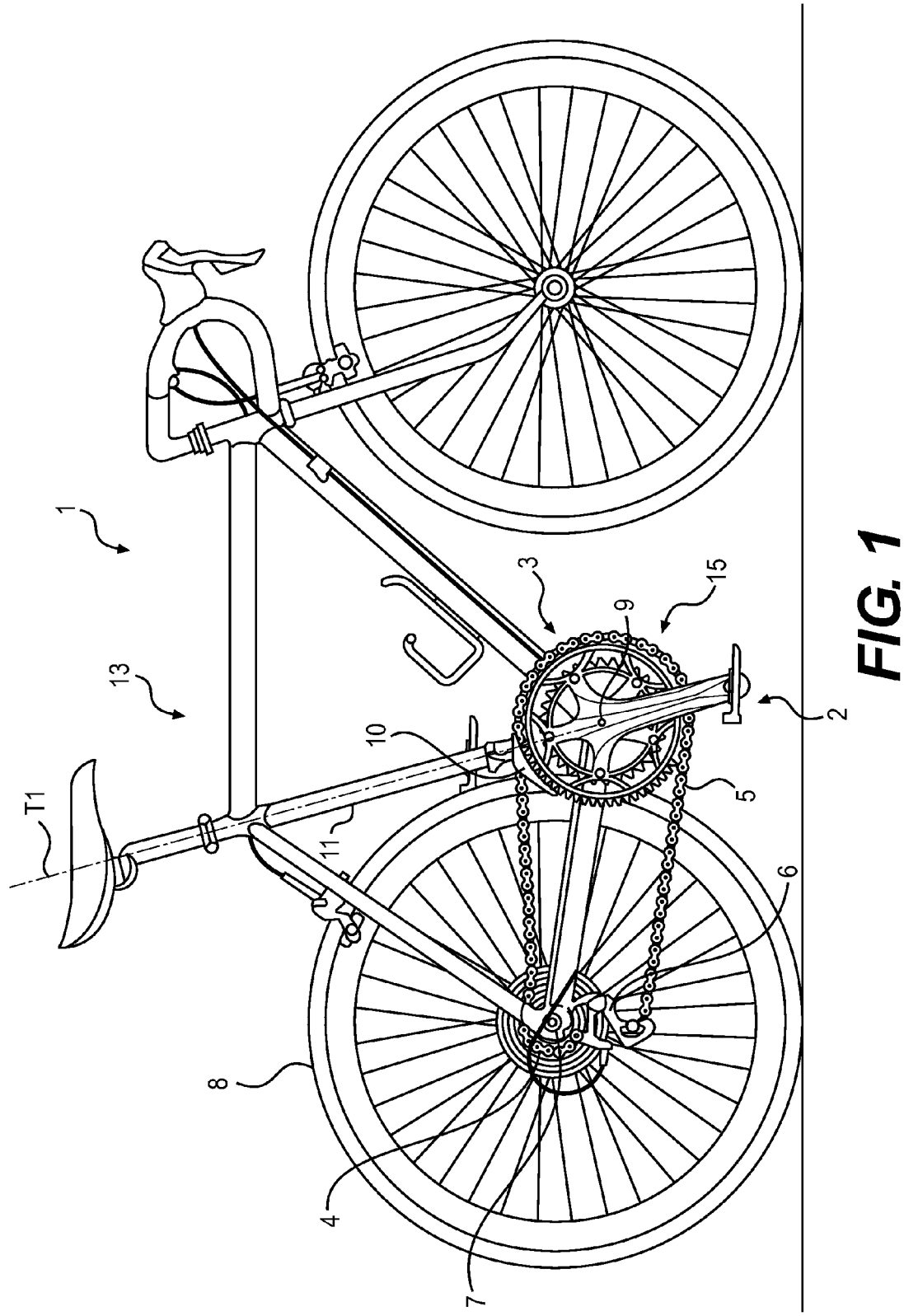
FIG. 1 is a side view of a bicycle including a front derailleur of the present invention.

Referring now to the drawings, in which like numerals refer to like components or steps, there are disclosed broad aspects of various exemplary embodiments. Several embodiments are described herein in detail as examples.

A first embodiment is illustrated in FIGS. 1-8. FIG. 1 shows a bicycle 1 having a frame 13 and a drive train 2 generally including a set of front chainwheels or chainrings 3, a set of rear chainwheels or cogs 4, a chain 5, a front derailleur 10 and a rear derailleur 6. The set of rear cogs 4 are mounted to a rear wheel 8 about a rear cog axis 7 and the front chainrings 3 are mounted to a crank assembly 15 about a front chainring axis 9. The chain 5 extends between and engages one of the chainrings 3 and one of the rear cogs 4. The front and rear derailleurs 10, 6 shift the chain 5 between the front chainrings 3 and rear cogs 4, respectively.

Figure 2:
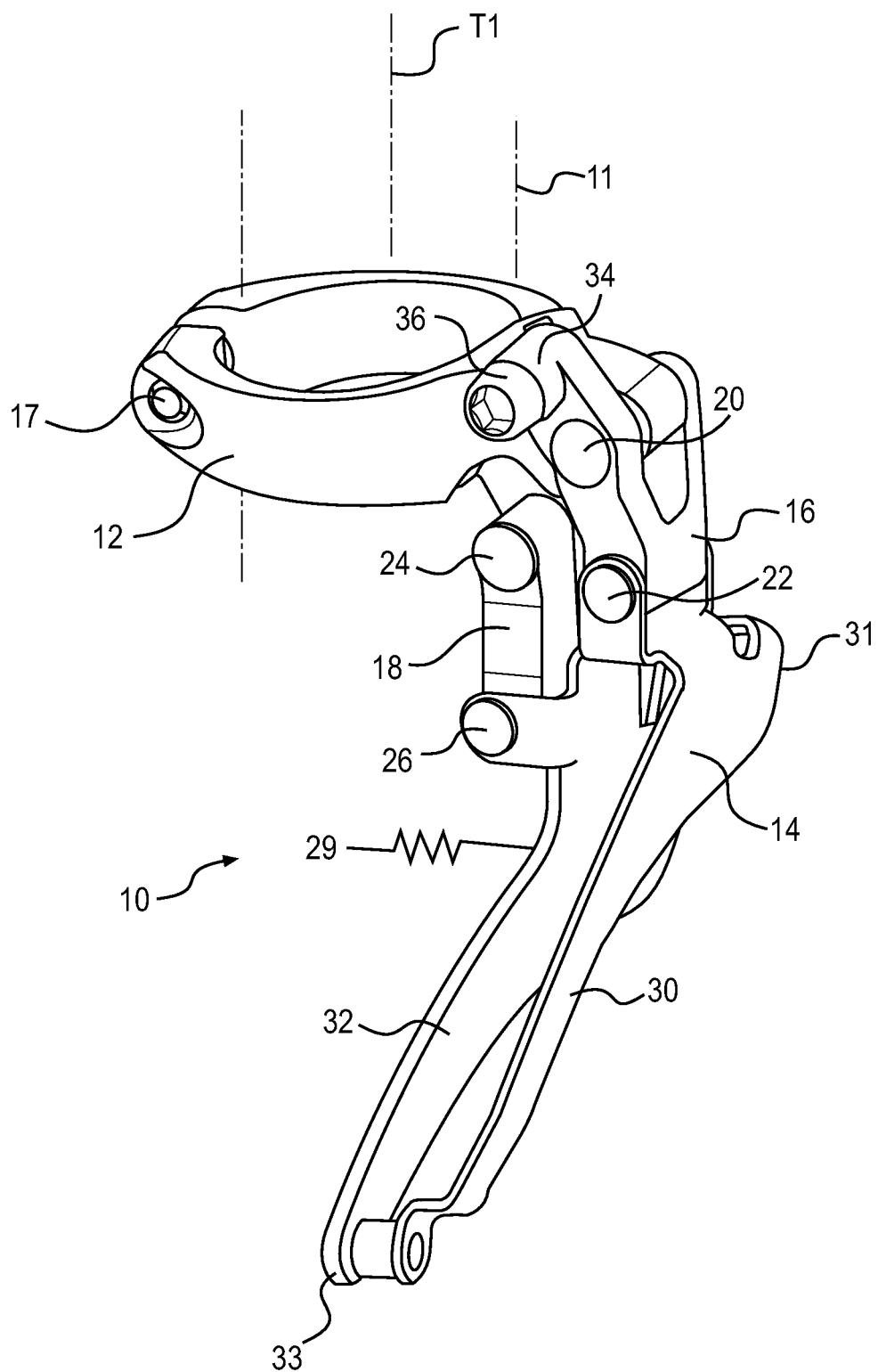
FIG. 2 is a perspective view of front derailleur according to a first embodiment.

Looking to FIGS. 1 and 2, the front derailleur 10 includes a mount 12. The mount 12, in this embodiment a clamp, wraps around and is affixed with a bolt 17 to a frame member, in this embodiment a seat tube 11, of the bicycle frame 13. In the illustrated example the seat tube 11 has a longitudinal central axis T1. The seat tube 11 may have any cross-sectional shape. Thus, the mount 12 is rigidly attached to the frame 13 of the bicycle 1, which will be considered in this application as a stationary reference point for the remaining components.

A movable element, in this embodiment a cage 14, is movably positioned relative to the mount 12 by an outer link 16 and an inner link 18. The outer link 16 has a first end pivotally connected to the mount 12 by a pivot pin 20 or other hinge. The other end of the outer link 16 is pivotally attached to the cage 14 by a pivot pin 22 or other hinge. The inner link 18 is pivotally attached to the mount 12 by a pivot pin 24 or other hinge. The lower end of the inner link 18 is attached to the cage 14 by a pivot pin 26 or other hinge. In this embodiment the mount 12, outer link 16, cage 14 and inner link 18 together form a four-bar linkage. A spring 29 can also connect the cage 14 to the mount 12 or frame 1, in some embodiments, to bias the cage 14 as is described in more detail below.

The cage 14 forms a structure that at least partially receives or straddles a portion the chain 5 with the chain 5 contained in between an outer side plate 30 of the cage 14 and an inner side plate 32 of the cage 14. The cage 14 also has a front end 31 and a rear region 33. The side plates 30 and 32 form contact portions that contact an exterior side of the chain 5 to displace the chain 5 laterally from one chainring to another in outboard and inboard directions. The cage 14 is moved laterally by providing an actuation force onto one of the links 16 or 18, or by providing an actuation force to the cage 14.

In the embodiment shown, the actuation force is applied to the outer link 16. An illustrated example, the outer link 16 has an extension arm 34 which receives a cable bolt 36 to clamp onto or otherwise attached to the end of an actuation cable. The cable may be manipulated to drive the outer link 16 so that it pivots about the pivot pin 20 thus forcing the cage 14 laterally outward away from the seat tube 11. The return spring 29 is schematically depicted and biases the cage 14 in one direction, while the cable pulls in the opposite direction against the return spring bias force to control movement of the cage 14. Although a cable bolt 36 is shown to receive force from an actuation cable, the front derailleur 10 can be actuated by other force-providing devices, such as for example pneumatics, hydraulics, electric motors or electrically or otherwise generated electric fields, or modulated versions of such, with or without a spring providing an opposed force. Other biasing devices may also be used in place of a spring.

Figure 3:
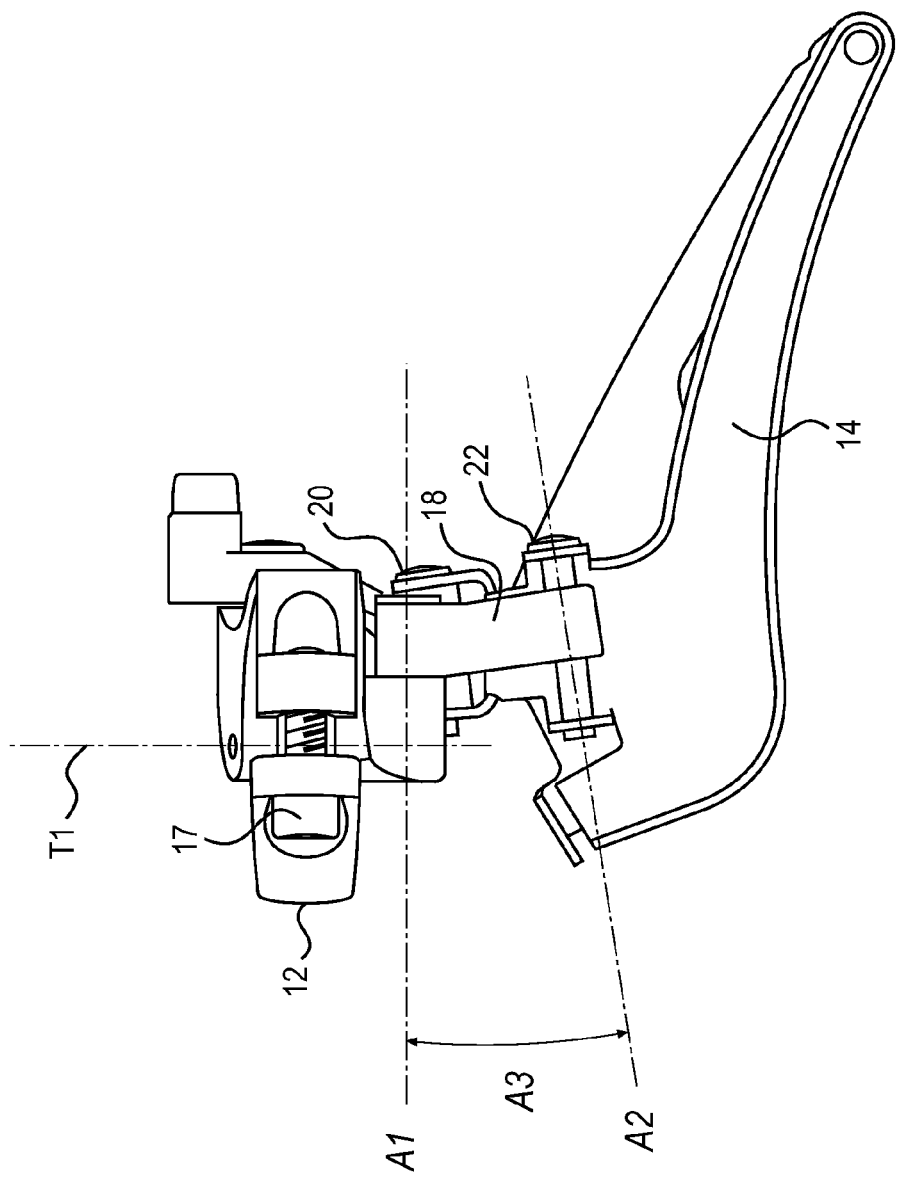
FIG. 3 is a side view of the derailleur assembly of FIG. 2.
Figure 4:
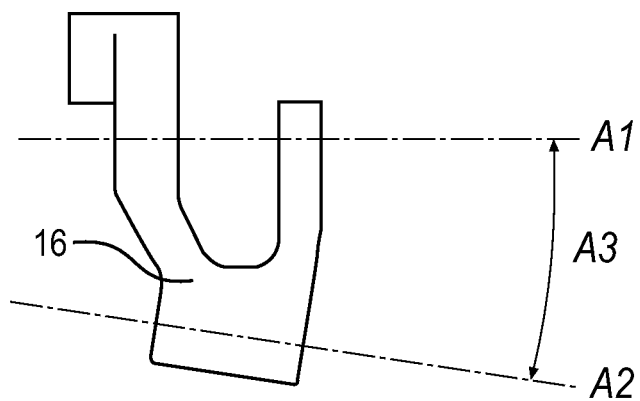
FIG. 4 is an outboard side view of an outer link used in the derailleur of FIG. 2.
Figure 5:
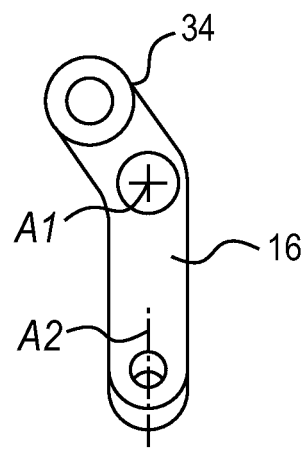
FIG. 5 is a rear end view of an outer link used in a derailleur of FIG. 2.
Figure 6:
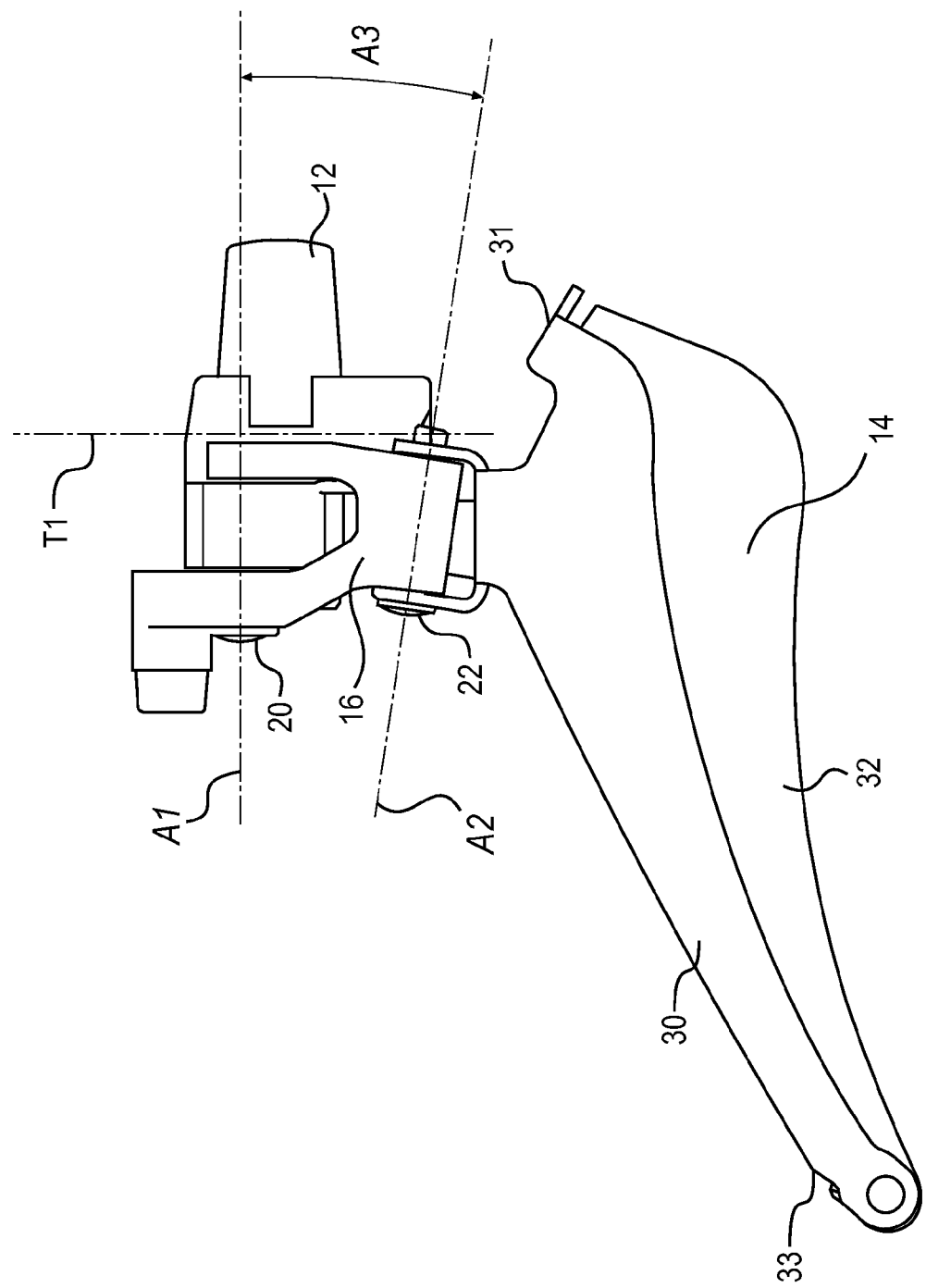
FIG. 6 is an outboard side view of the derailleur assembly of FIG. 2.

As shown particularly in FIGS. 3-6, the outer link 16 is mounted such that the pivot pin 20 is oriented along a first or upper pivot axis A1. The lower pivot pin 22 is oriented along a second or lower pivot axis A2. Therefore, motion of the outer link 16 relative to the mount 12 is about axis A1, and motion of the cage 14 relative to the outer link 16 is about axis A2. Axes A1 and A2 are not parallel with each other, but rather deviate from each other angularly by a skew or nonzero angle A3. The nonzero angle A3 may be generally within the range of two to twenty degrees. FIG. 3 depicts the axis A1 being substantially perpendicular to the seat tube axis T1. However, as discussed further below, this orientation is for example only and other orientations relative to axis T1 can be implemented. FIG. 4 provides an outboard side view of the outer link 16 as viewed from the frame depicting the axis A1 and A2, as well as the skew angle A3. FIG. 5 is a rear view of the outer link 16 along the upper axis A1, and illustrating that the lower axis A2 is at an angle thereto. The inner link 18 is mounted such that the pivot pin 24 is oriented along a third pivot axis and the pivot pin 26 is oriented along a fourth pivot axis. The third and fourth pivot axes may not be parallel with each other, but rather deviate from each other angularly by a nonzero angle generally within the range of two to twenty degrees.

Figure 7:
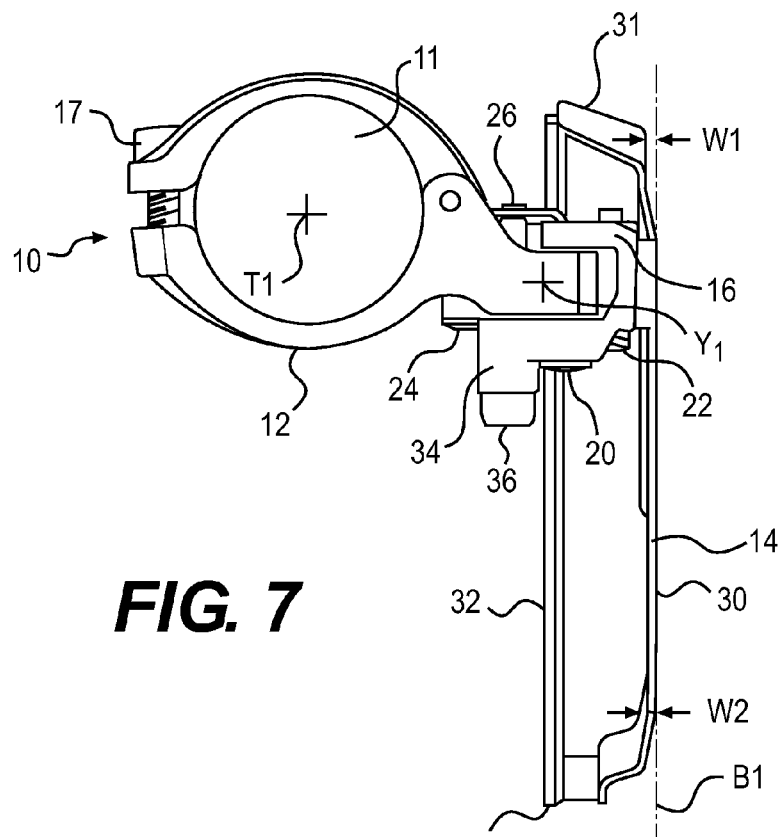
FIG. 7 is a top view of the derailleur of FIG. 2 in a first position.
Figure 8:
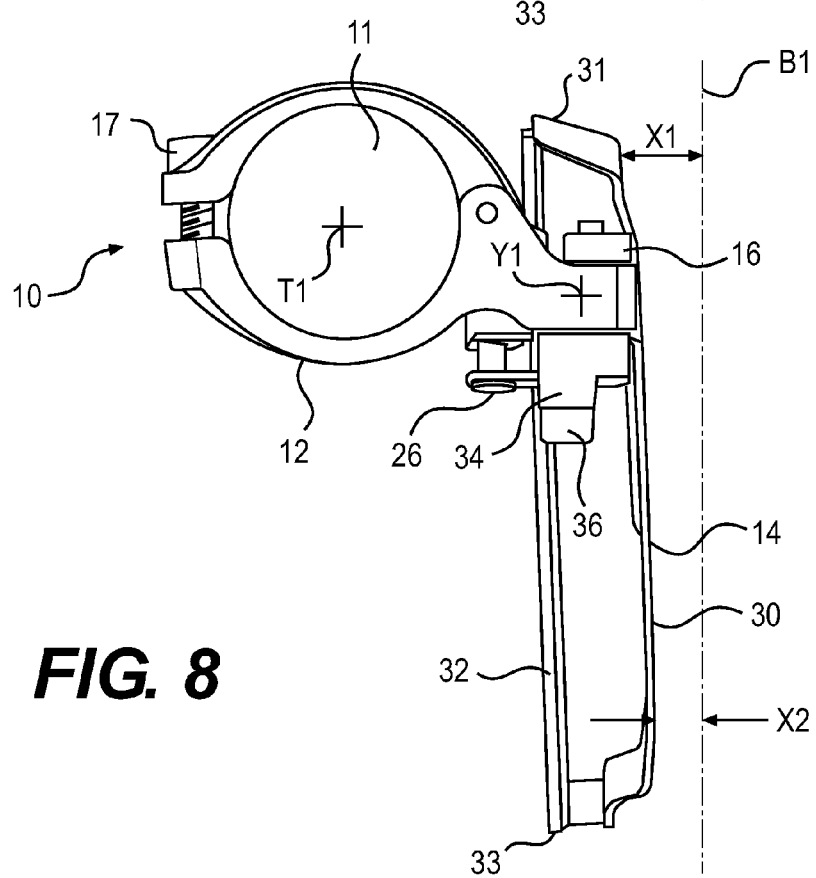
FIG. 8 a top view of the derailleur of FIG. 2 in a second position.

FIGS. 7 and 8 depict the cage 14 of the front derailleur 10 in first and second positions respectively. The first position as shown in FIG. 7 may correspond to a cage position oriented more outwardly or outboard, away from the mount 12 on the seat tube 11, which may be the case for example after positioning the chain 5 on a chainring which is farther from the seat tube 11, in which in some examples may be a larger chainring.

FIG. 8 illustrates the front derailleur cage 14 after it has been moved to a second position. In this example, the second position is a more inwardly or inboard position, moved relatively closer to the seat tube 11, which may be the case for example after positioning the chain on a chainring which is closer to the seat tube 11, in which in some examples may be a smaller chainring. Due to the skew angle, the sides 30 and 32 of the cage 24 are oriented at an angle relative to the line B1.

In FIGS. 7 and 8 the reference line B1 lies in a plane perpendicular to the front chainring axis 9. The sides 30 and 32 are generally as parallel to each other in this example, but may be angled relative to each other. Also in some embodiments the outboard or outer front chainring may be generally aligned with a center of the rear gearset, while the inboard or inner front chainring may be more inboard than a center of the rear cog set. In such a case the first position of FIG. 7 would generally correspond with an alignment of the chainring, while in the second case the cage 14 can be described as being canted outwardly so that its rear end 33 points rearwardly outwardly towards the center of the rear cog set.

It will be appreciated that in the second position shown in FIG. 8, the cage 14 has rotated about a yaw axis Y1, relative to the first position shown in FIG. 7. This is also shown by the difference between distance W1 compared to X1 and distance W2 relative to X2. In this embodiment, the yaw axis Y1 is parallel to the seat tube axis T1. Some applications for the movement of the cage 14 about the yaw axis Y1 are further described herein, for example below with respect to FIGS. 16 and 17. Although this embodiment uses two pivot pins or hinges on each link, in other related embodiments a ball and socket joint, cam and follower or other pivoting connection or coupling device can be used in place of any or all of the pivot pin locations.

Figure 9:
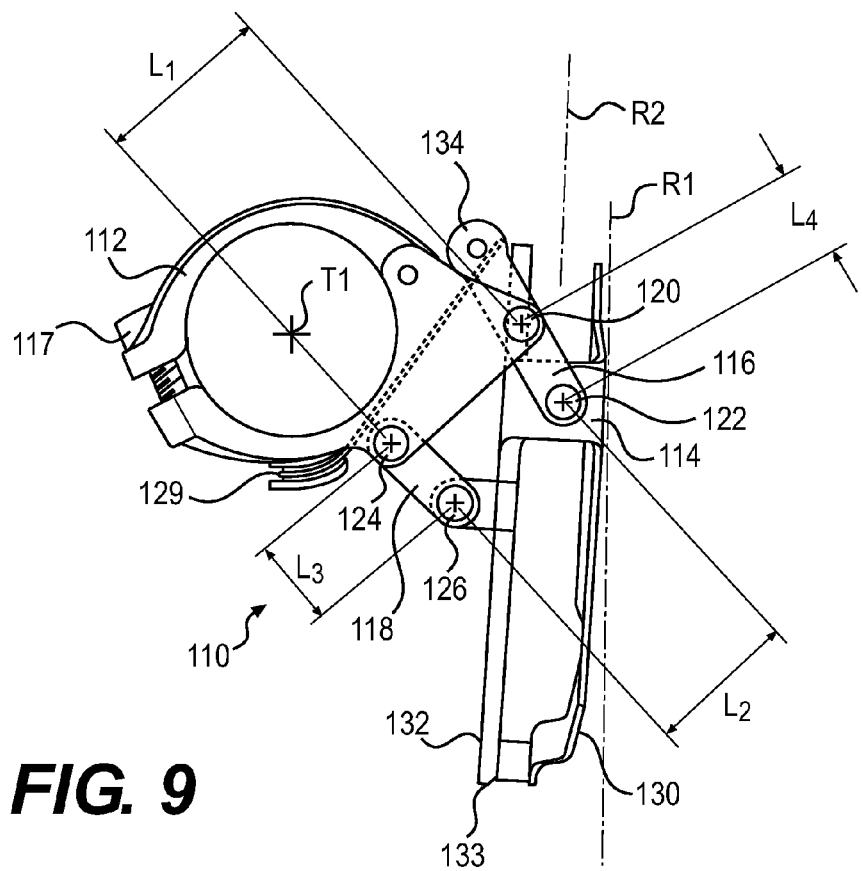
FIG. 9 is a top view of a derailleur according to a second embodiment, in a first position.
Figure 10:
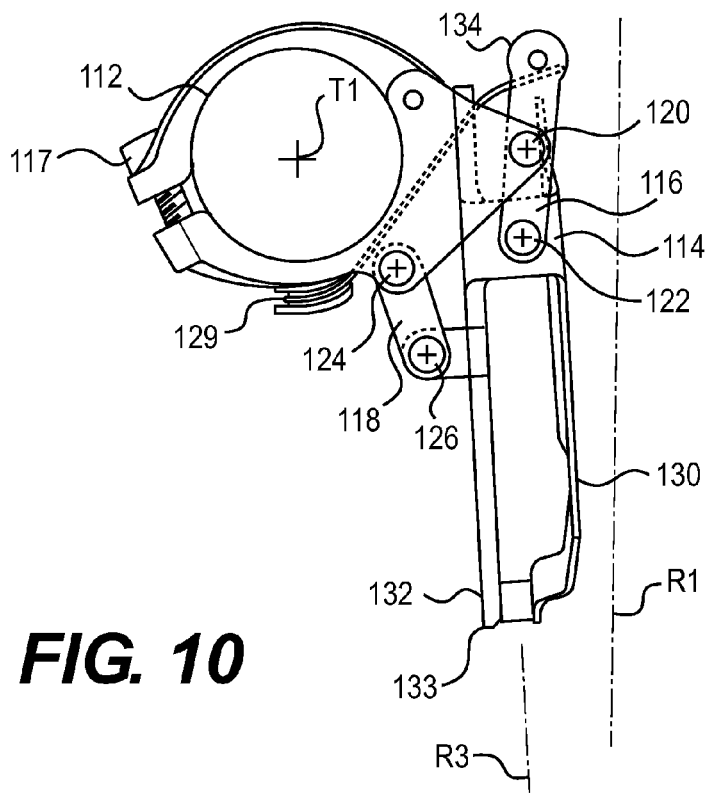
FIG. 10 is a top view of the derailleur of FIG. 9 in a second position.

FIGS. 9 and 10 illustrate a second embodiment of the invention. A derailleur assembly 110 includes a mount 112 that can be affixed to the seat tube 11 generally as described above with respect to the mount 12 and a clasping bolt 117. A cage 114 is provided which is generally similar to the cage 14 described above, and includes side plates 130 and 132, rear end 133 and a cable guide 129. The embodiment of FIGS. 9 and 10 may also include a return spring or other biasing arrangement which is not shown in these views.

In this embodiment, instead of inner and outer links, a front link 116 is provided along with a rear link 118. The front link 116 is connected to the mount 112 by a pivot pin or other hinge 120 and is connected to the cage 114 by a pivot pin 122 or other hinge. The rear link 118 is connected to the mount 112 by a pivot pin 124 or other hinge and is connected to the cage 114 by a pivot pin 126 or other hinge. A distance L1 is defined between the pivot pins 120 and 124. A distance L2 is defined between pivot pins 122 and 126. In this embodiment the pivot pins 120 and 124 are oriented generally vertical, or generally parallel with the seat tube axis T1. In this embodiment, L1 and L2 are selected to be different lengths. Alternatively, lengths L3 and L4 are selected to be different lengths. Further in this embodiment L1 is selected to be longer than L2. The front link 116 may include an extension arm 134 to which is mountable a cable bolt, as described above with respect to extension arm 34.

FIGS. 9 and 10 show that the cage 114 is disposed and oriented in a first position of FIG. 9, which may be an outboard position, compared to a second position of FIG. 10, which may be an inboard position. Specifically, with respect to a reference line R1 in the first position shown in FIG. 9 the cage 114 is disposed outboard but is oriented so that the rear end 133 is pointed somewhat inwardly, whereas in the second position of FIG. 10 the cage is disposed inboard but the rear end 133 is pointed somewhat outwardly. These first and second positions can be selected by selecting the difference in lengths between L1 and L2 so that the position in FIG. 9 generally corresponds to an average chain path when the chain is engaged on the outer ring, and the orientation of the cage in FIG. 10 generally corresponds to an average chain path when the chain is engaged on the inner ring. The reference line R1 lies in a plane perpendicular to the front chainring axis 9.

Figure 11:
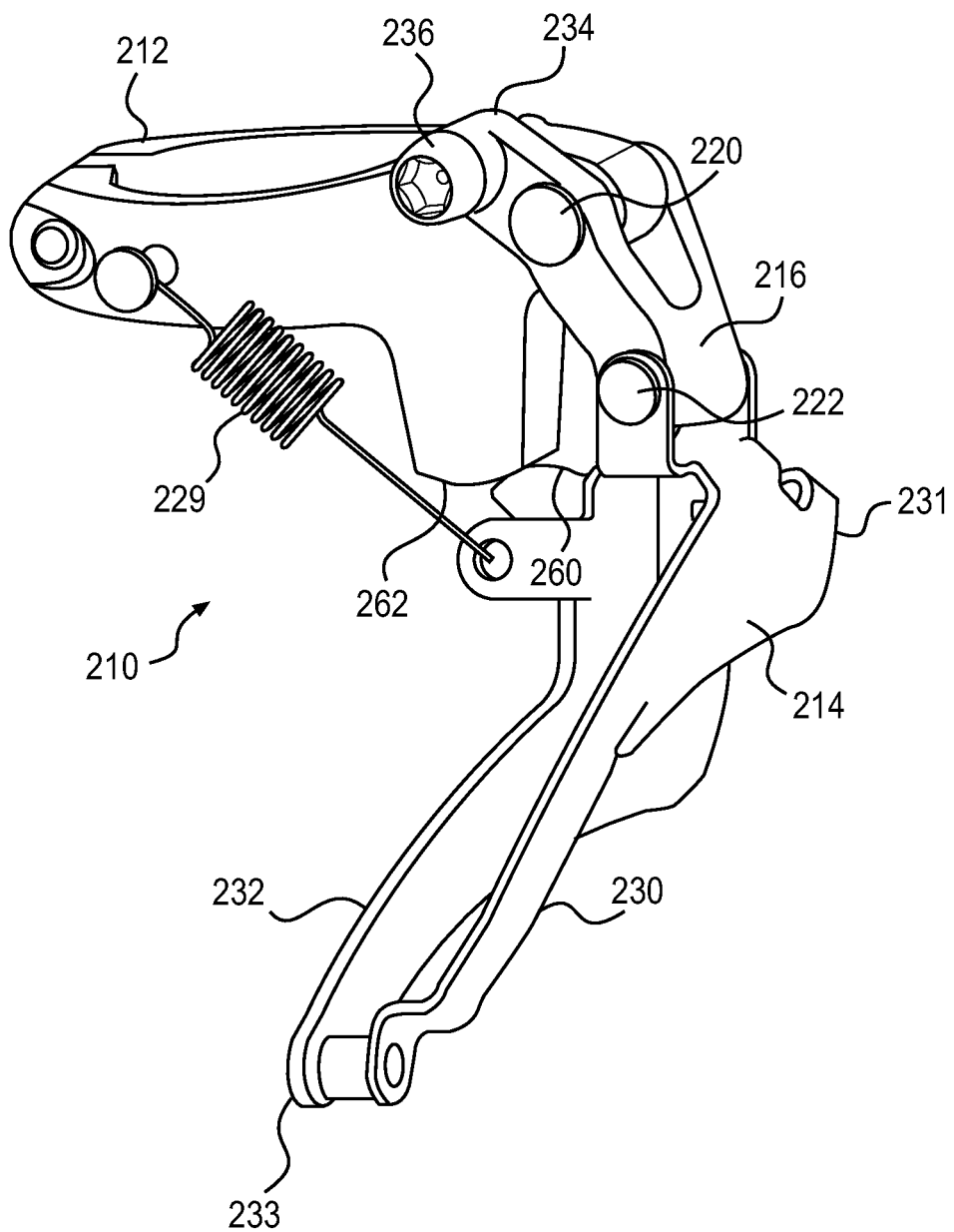
FIG. 11 is a perspective view of a derailleur according to a third embodiment.
Figure 12:
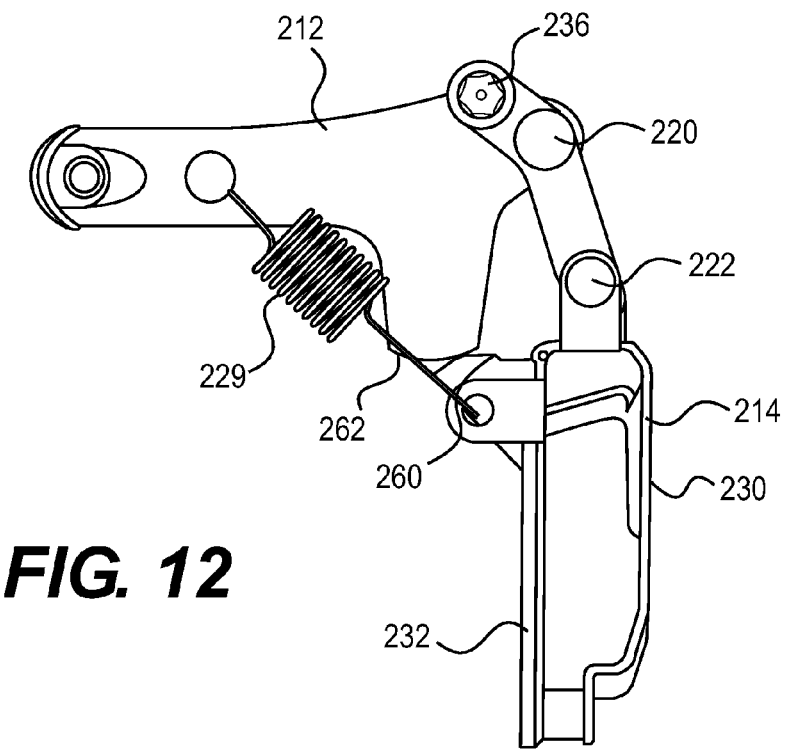
FIG. 12 is a rear view of the derailleur of FIG. 11 in a first position.
Figure 13:
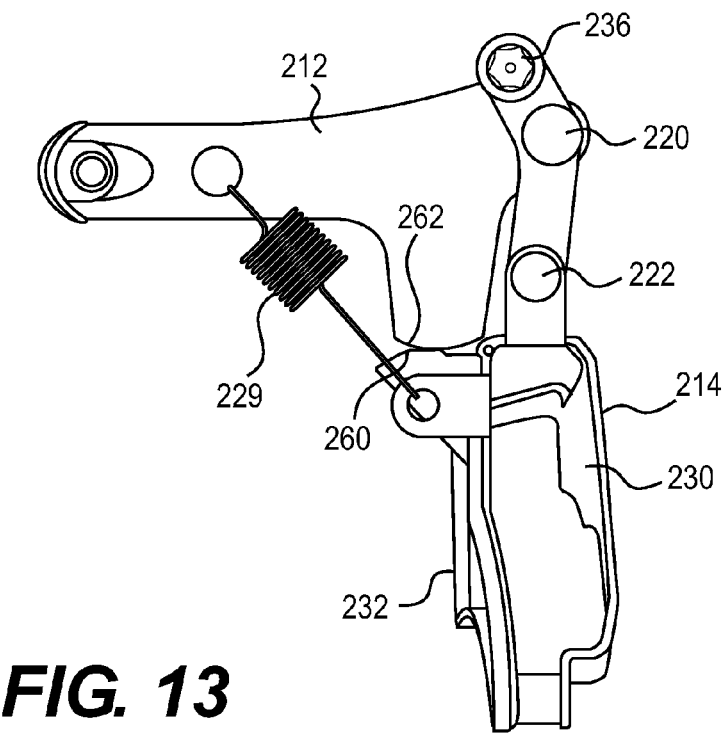
FIG. 13 is a rear view of the derailleur of FIG. 11 in a second position.

FIG. 11 is a perspective view of a third embodiment. A derailleur 210 includes a mount 212 which can be substantially similar to that described with respect with mount 12 above. A cage 214 is also provided as described with respect to cage 14 above, including sides 230 and 232, front region 231, rear region 233 and return spring 229. In this embodiment, rather than the combination of an inner link and outer link, or a front link and a rear link, an single link 216 is provided along with pivot pins 220 and 222 or other hinges, such that the single link 216 is connected to the mount 212 by the pivot pin 220 and to the cage 214 by the pivot pin 122. An extension arm 234 and cable bolt 236 are shown which may operate similar to the actuation extension 34 and cable bolt 36 described above. As with the embodiment described above, and all embodiments described herein, the extension arm or other derailleur parts can be operated by other than cable actuation such as by other force-providing devices, such as for example pneumatics, hydraulics, electric motors or electrically or otherwise generated electric fields, or modulated versions of such, with or without a spring providing opposed force. Also other biasing devices may be used in place of a spring.

This embodiment is an example where a single link 216 is used, such that movement of the cage is defined by the pivot pin 222, and also by contact between a cam surface 260 provided on the cage 214 and an opposing cam surface 262 provided on the mount. The surfaces 260 and 262 are illustrated as curved opposed surfaces, each convex and facing the other one, such that the cam surface 260 rides on and follows the cam surface 262. Alternatively, any other type of profiled, contacting, following or engaging surfaces may be used, such as for example a roller mounted on cage 214 configured to roll along cam surface 262.

In this embodiment, the axis of the pivot pin 220 is at an angle to the axis of the pivot pin 222 in the manner discussed above with respect to skew angle A3 between axis A1 and A2, and yaw axis Y1. Therefore, this embodiment will provide an angular motion about a reference yaw axis similar to that shown in FIGS. 7 and 8.

Figure 14:
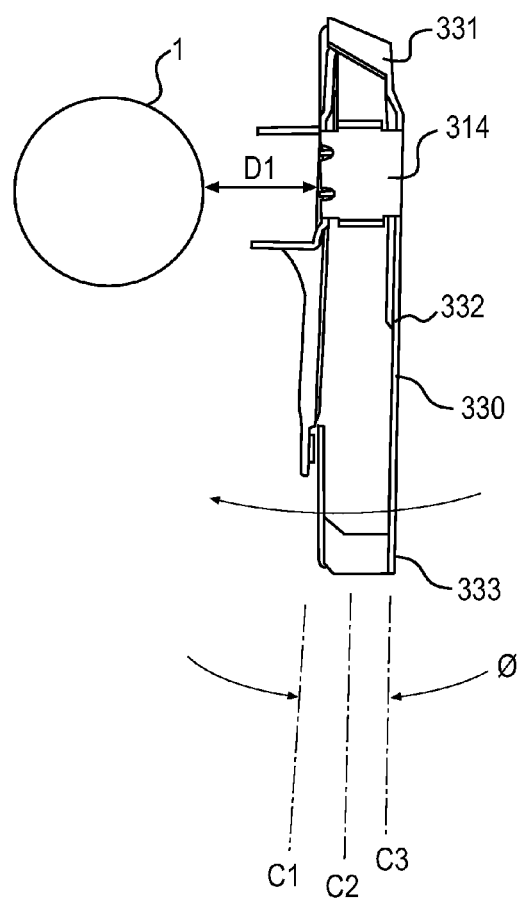
FIG. 14 is a top layout view of a derailleur according to some various embodiments in a first position.
Figure 15:
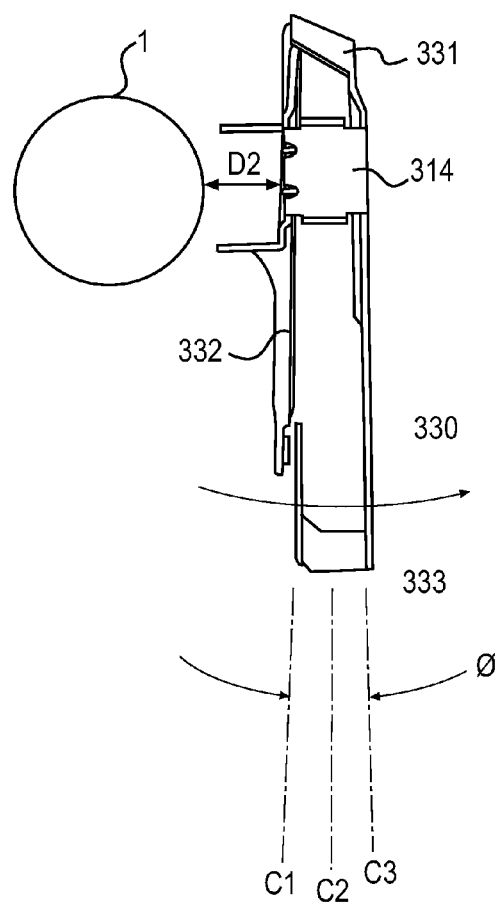
FIG. 15 is a top layout view of a derailleur according to some various embodiments in a second position.

FIGS. 14 and 15 provide some additional details regarding some embodiments, with FIG. 14 showing a cage 314 in outboard first position and FIG. 15 showing the cage 314 in an inboard second position. In the embodiments illustrated in FIGS. 14 and 15, the outer wall of the cage 330 and the inner wall of the cage 332 are not depicted as parallel to each other but are themselves at an angle θ to each other. This angle θ diverges to the rear such that the portions of the wall 330 and 332 that may contact the chain during shifting are spaced closer together towards the front of the cage and further apart towards the rear of the cage, as shown by the angle θ between lines C1 and C3. In this example, the cage 314 changes its own orientation between the two positions by rotating about a yaw axis in one of the manners that has been described above. Thus, FIGS. 14 and 15 also depict a cage that rotates about a yaw axis relative to a frame member such as a seat tube. The yaw axis is not separately labeled in this drawing but is represented by the center of the curved arrows indicating directions of rotation. The yaw angle of rotation between two positions can be selected to approximately or exactly correspond to the angle between the side walls 330 and 332. In such an example, the geometry can be selected so that in the position shown in FIG. 14 the chain contacting surface outer wall 330 is aligned along line C3 parallel to the front chainring shown as line C2, and in the position shown in FIG. 15 the inner wall 332 is aligned along line C1 parallel to the direction of the front chainring shown as line C2.

Although a single inward or inboard position and a single outward or outboard position are specifically illustrated, it will appreciated that the front derailleur may be used with front drives having more than two chainrings, including three or more chainrings. Depending on the extent of the lateral motion, which might be larger in the case of three or more chainrings, the front derailleur geometry can be selected so that the overall change in yaw orientation of the cage is increased. Depending on the number of rear cogs, a range of possible chain angles spanning between front and rear cogs is possible, and the geometry can be selected to provide a suitably wide range of angular diversion of the longitudinal axis of the cage, or rotation about the yaw axis, to accommodate the range of chain angles.

FIGS. 16 and 17 are diagrams representing a front derailleur cage 430 along with a front drive having a large outward chainring 402 and a small inward chainring 404, and a rear cog set having multiple cogs disposed between a small outward cog 406 and a large inward cog 408. The possible angles of the chain 80 are shown in dotted lines 409A, 409 B, 409C and 409D, such that it can be seen at the cage 430 changes angle with its rear end pointing somewhat inboard in FIG. 16 compared to FIG. 17 in order to accommodate the possible range of chain angles. The accommodation of the range of chain angles in some instances can reduce or eliminate rasping after gear changes.

Some embodiments also provide a method of shifting gears, for example bicycle gears. As illustrated in the drawings the method can include moving a movable element, such as a chain cage 14, from a first position to a second position, where the movement causes the cage 14 to contact an exterior side of a chain to displace the chain, and the movement includes a lateral displacement relative to the frame combined with rotation of the cage about a yaw axis.

Some embodiments are implemented with the cage being moved in a lateral side-to-side direction that is generally perpendicular to the path of the chain, and with the yaw axis being generally perpendicular to the direction of lateral motion of the cage.

The drawings illustrate a cage that has at least two side plates that are connected as a unit and both move laterally and about the yaw axis together. However, embodiments are possible using the structures described herein to move only one or the other side plate independently of the other such that only one of them has rotation about the yaw axis.

The cage may be described as moving laterally, or side-to-side with respect to the frame. However, this movement so described does not necessarily need to be linear, and in fact can include a curved or actuate path that appears lateral when viewed from a given perspective.

The embodiments described here and may be suitable for use with index shift systems in which the derailleur moves between preset lateral positions. Additionally, the embodiments described may be suitable for use with trim-adjusting derailleurs in which the derailleur adjusts the cage lateral position after shifting has occurred to reduce or eliminate rasping. Further, various embodiments described here do not depend on a chain riding on tooth sprockets or cogs, but rather can be used with any elongated band expanding from front to back that is being moved laterally at the derailleur location. Other band engagement systems might include tooth belts or v-belts being moved between tooth wheels or pulleys.

The references in this description to a vertical direction, front ends, rear ends, and sides is merely for setting reference orientations and it will be appreciated that some embodiments of the device may be oriented in any spatial arrangement and affixed to a component in any spatial arrangement. Also the reference to yaw refers to a rotational movement compared to a lateral displacement but does not need to be about a vertical axis. Further, the embodiments described above include examples where the cage is depicted as generally extending or projecting "below" the mount and link components; however, the cage may extend upward or laterally or in any spatial direction relative to such other components.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A front derailleur for a bicycle having a frame and a chain engaging one of a plurality of front chainwheels having a front chainwheel axis and engaging one of a plurality of rear chainwheels having a rear chainwheel axis, the front derailleur comprising:
   a mount configured to be fixed to the frame;
   a movable element separate from the mount and having front and rear ends, the front end being farther from the rear chainwheels than the rear end, the movable element interiorly receiving a portion of the chain, the movable element contacting an exterior side of the chain to laterally displace the chain between the plurality of front chainwheels; and a linkage connecting the movable element to the mount and configured to move the movable element from a first position to a second position relative to a plane perpendicular to the front chainwheel axis, the front end of the movable element moving a first distance from the first position to the second position relative to the plane, the rear end of the movable element moving a second distance from the first position to the second position relative to the plane, the first distance being greater than the second distance.

2. The front derailleur according to claim 1, wherein the mount has a first cam surface and the movable element has a second cam surface that slidably contacts and follows the first cam surface.

3. The front derailleur according to claim 1, wherein the linkage includes:

a first link member connecting the cage to the mount, the first link member being pivotally connected to the mount about a first pivot axis, and the first link member being pivotally connected to the cage about a second pivot axis, the first link member having a length between the first and second pivot axes; and a second link member connecting the cage to the mount, the second link member being pivotally connected to the mount about a third pivot axis, and the second link member being pivotally connected to the cage about a fourth pivot axis, the second link member having a length between the third and fourth pivot axes, wherein one of the first and second link lengths are unequal to each other and a length between the first and third axes and a length between the second and fourth axes are unequal to each other.

4. The front derailleur according to claim 3, wherein the first, second, third and fourth pivot axes are substantially vertical when the derailleur is mounted.

* * * * *